United States Patent [19]

Lee et al.

[11] Patent Number: 4,510,076
[45] Date of Patent: Apr. 9, 1985

[54] ELECTRICALLY CONDUCTIVE POLYMER BLENDS OF AN ACETYLENE POLYMER AND A TRIBLOCK THERMOPLASTIC ELASTOMER

[75] Inventors: Kang I. Lee, Framingham; Harriet Jopson, Weston, both of Mass.

[73] Assignee: GTE Laboratories, Inc., Waltham, Mass.

[21] Appl. No.: 554,671

[22] Filed: Nov. 23, 1983

[51] Int. Cl.$^3$ ............................................. H01B 1/00
[52] U.S. Cl. .................................. 252/500; 252/512; 252/518; 524/80; 524/401
[58] Field of Search ............... 252/500, 512, 518, 519; 525/192, 202, 247, 275, 328.1, 333.1, 356; 524/80, 401, 500, 505

[56] References Cited

U.S. PATENT DOCUMENTS 4,222,903  9/1980  Heeger et al. ...................... 252/518
4,394,304  7/1983  Wnek ................................. 252/500

FOREIGN PATENT DOCUMENTS 596806  4/1960  Canada .

OTHER PUBLICATIONS

*Chemical Engineering,* May 2, 1983, p. 23, "Several Topics Star at ACS Meeting".
MacDiarmid, Alan and Heeger, Alan, "Organic Metals and Semiconductors: The Chemistry of Polyacetylene, (CH)$_x$, and its Derivatives", *Synthetic Metals* 1, 101–118, (1979/1980).
Lee, Kang I. and Jopson, Harriet, "Electrically Conductive Ethylene–Propylene–Diene Terpolymer/Polyacetylene Blends", *Makromol. Chem. Rapid Commun.* 4, 375–378, Jun., 1983.
Lee, Kang I. and Jopson, Harriet, "Ethylene–Propylene–Diene Terpolymer/Polyacetylene and Styrene–Diene Triblock Copolymer/Polyacetylene Blends; Characterization and Stability Studies, *Polymers in Electronics,* ACS Symposium Series 242, 497–506 (1984).
Rubner, M., Tripathy, S., Lee, K., Georger, J., Jopson, H., Cholewa, P., "Structure–Property Relationships of Polyacetylene/Elastomer Blends", ACS Meeting, Mar. 20, 1983, ACS Abstract.
Galvin, Mary E. and Wnek, Gary E., "Electrically Conductive Polymer Composites: Polymerization of Acetylene in Polyethylene", *Polymer Communications,* vol. 23, Jun., 1982, pp. 795–797.
Lee, Kang I., Jopson, Harriet, Tripathy, S., and Rubner, Michael, "Electrically Conductive Thermoplastic Elastomer/Polyacetylene Blends", American Chemical Society Presentation on Mar. 23, 1983, ACS Abstract.
Lee, Kang I., Jopson, Harriet, "Electrically Conductive Thermoplastic Elastomer/Polyacetylene Blends", *Polymer Bulletin,* vol. 10, pp. 105–108, Jun. 1983.

*Primary Examiner*—Josephine L. Barr
*Attorney, Agent, or Firm*—Hamilton, Brook, Smith & Reynolds

[57] ABSTRACT

Electrically conductive polymer blends of an acetylene polymer, such as poly(acetylene), and a triblock thermoplastic elastomer, such as styrene-butadiene-styrene, are disclosed. In addition, a method for preparing such blends wherein the acetylene polymer is preferentially formed in the central elastomeric block of the triblock copolymer is disclosed. These blends exhibit high conductivity and elasticity upon doping with electron donors or electron acceptors.

6 Claims, 1 Drawing Figure

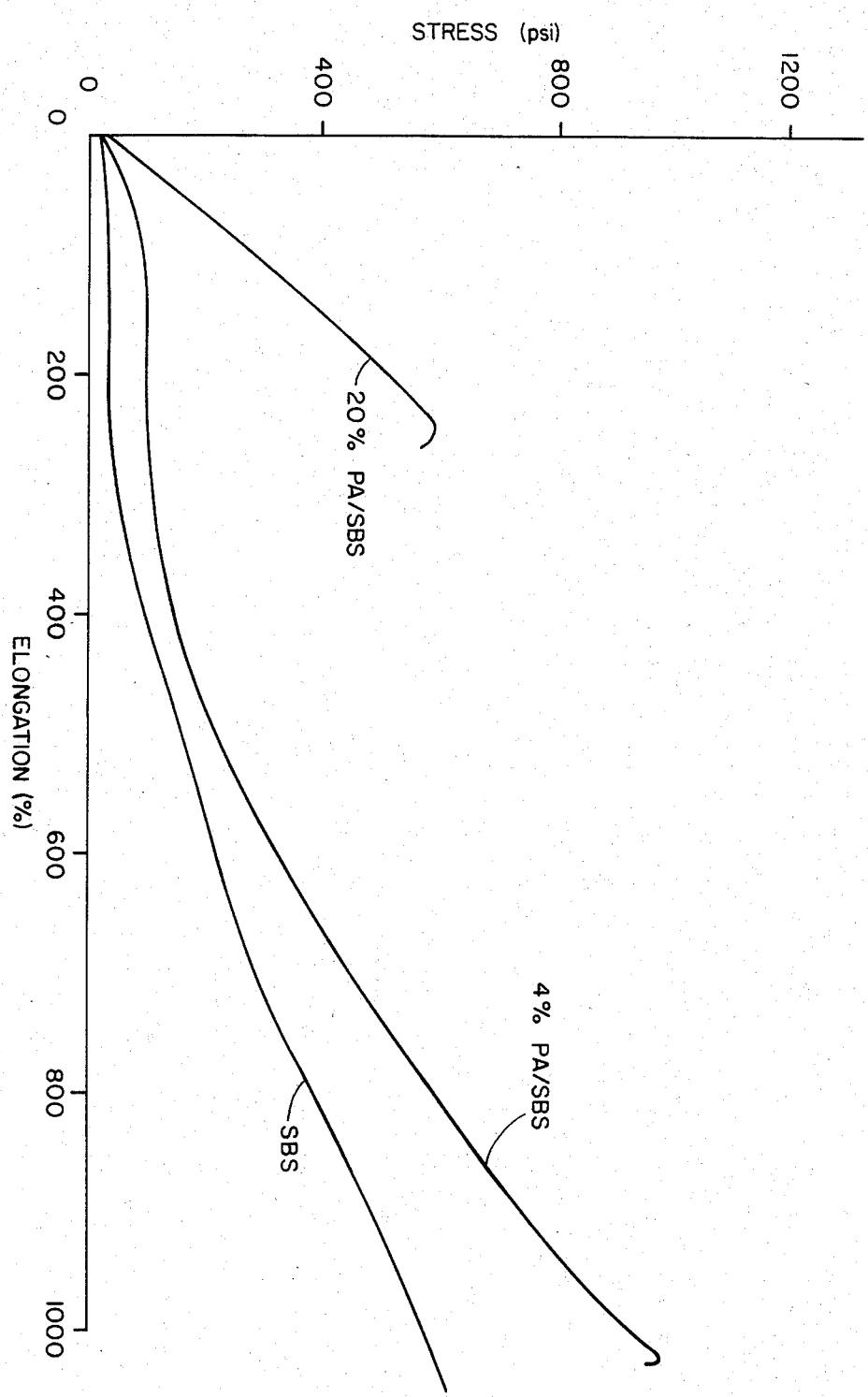

ELECTRICALLY CONDUCTIVE POLYMER BLENDS OF AN ACETYLENE POLYMER AND A TRIBLOCK THERMOPLASTIC ELASTOMER

TECHNICAL FIELD

This invention is in the field of polymer chemistry and more specifically relates to electrically conductive polymer blends of an acetylene polymer and a triblock thermoplastic elastomer.

BACKGROUND ART

Poly acetylene, $(CH)_x$, is the simplest possible conjugated organic polymer. Because of this fundamental nature, polymers of acetylene have always held special interest to polymer chemists. This interest was heightened when it was found that the electrical conductivity of poly(acetylene) could be significantly enhanced by doping the polymer with electron acceptors. See Berets et al., *Trans Faraday Soc.*, 64 823-8 (1968).

The first polymers of acetylene were prepared in powder form. Subsequently, however, Shirakawa and others succeeded in synthesizing lustrous, silvery, polycrystalline films of poly(acetylene), and developed techniques for controlling the cistrans content of such films. See H. Shirakawa and S. Ikeda, *Polym. J.*, 2 (1971) 231; H. Shirakawa, T. Ito and S. Ikeda, *Polym. J.*, 4 (1973) 460; T. Ito, H. Shirakawa and S. Ikeda, *J. Polym. Sci., Polym. Chem. Ed.*, 12 (1974) 11; and T. Ito, H. Shirakawa and S. Ikeda, *J. Polym. Sci., Polym. Chem. Ed.*, 13 (1975) 1943.

Continued work by Shirakawa resulted in the discovery that the polycrystalline film could be doped with electron acceptors to markedly increase electrical conductivity of such films to levels characteristic of or approaching the conductivities of metals. See U.S. Pat. No. 4,222,903 to Shirakawa et al. In fact, it has now been demonstrated that chemical or electrochemical doping with electron donors or electron acceptors can increase the electrical conductivity of polycrystalline films of poly(acetylene) by over 12 orders of magnitude. Thus, the electrical conductivity of these films can range from that of an insulator ($10^{-10}$ ohm$^{-1}$ CM$^{-1}$) to that of a semiconductor, to that of a metal ($10^3$ ohm$^{-1}$ cm$^{-1}$). See *Synthetic Metals* 1, 101-118 (1979/80) Elsevier Sequoia S.A., Lausanne.

Unfortunately, poly(acetylene) has poor mechanical and physical properties. It is, for example, insoluble, intractable and infusable, making it difficult or impossible to process. Additionally, although polyacetylene film remains reasonably flexible if maintained in an inert atmosphere, it quickly becomes brittle upon exposure to ambient conditions.

Because of the potential offered by the unique electrical properties, much effort has been devoted to improving the mechanical and physical properties of polymers based upon acetylene. For example, substituted analogs of acetylene, such as methylacetylene and phenylacetylene, have been polymerized in the form of polycrystalline films. While these polymers of substituted acetylenes showed improved mechanical properties, their electrical conductivities were several orders of magnitude smaller than those obtainable for doped poly(acetylene). See Cukor, P., Krugler, J. I. and Rubner, M. F., *Polym. Prep., Am. Chem. Soc. Div. Polym. Chem.*, 1980, 21 161. Poly(phenylacetylene) also showed a much more rapid decrease in electrical conductivity than poly(acetylene); in fact, catastrophic failure of poly(phenylacetylene) was found to occur in less than 250 hours of exposure to ambient conditions. See Deits, W., Cukor, P., Rubner, M. and Jopson, H., "Stability and Stabilization of Polyacetylene, Polyphenylacetylene, and Acetylene/Phenylacetylene Co-polymers," *Synthetic Metals*, 4 (1982) 199–210.

Previous research has also focused on efforts to produce co-polymers of acetylene, such as copolymers of acetylene with phenylacetylene or methylacetylene. See Deits, W., Cukor, P., Rubner, M., Jopson, H., *Synthetic Metals*, 4 (1982) 199; and Chien, J. C. W., Wnek, G. E., Karasz, F. E., Hirsch, J. A., *Macromolecules*, 14 (1981), 479. This work was carried out with the hope that the structure of the polymer backbone would result in unaltered electrical properties whereas the side groups would impart processing advantages. While the co-polymers were found to have some processing advantages over the homopolymer, it was unfortunately found that this was accomplished with concomittant significant decreases in electrical conductivity.

Research efforts with acetylene polymers then took another direction and focused upon blends of acetylene with other polymers. One such blend was prepared by polymerizing acetylene in solid low density polyethylene films impregnated with Ziegler-Natta catalyst. See Galvin, M. E. and Wnek, G. E., *Polymer* 23 (1982), 795-7. Such blends are also described and claimed in U.S. Pat. No. 4,394,304, issued to Wnek.

In order to introduce the poly(acetylene) into the polyethylene matrix, these researchers employed high polymerization temperatures (e.g., 100°-110° C.) for acetylene. Such high temperatures were necessary to break the crystallinity of the polyethylene so that acetylene could penetrate the polyethylene. Such high polymerization temperatures can lead to side reactions, however, such as crosslinking and chain scission reactions. Also, blends of polyacetylene and polyethylene are still relatively rigid materials because the host polymer polyethylene remains a partially crystalline material.

More recently, blends of polyacetylene with the elastomer, polybutadiene, have been described. See Rubner, M. F., Tripathy, S. K., Georger, J., Jr. and Cholewa, P., "Structure-Property Relationships of Polyacetylene/ Polybutadiene Blends," *Macromolecules*, 16, (1983) 870-5. While polybutadiene and other conventional elastomers, may add flexibility to such blends, they are typically not suitable host polymers for poly(acetylene). This is due to the fact that such polymers generally require post-curing processes subsequent to blend preparation. These curing processes typically require heat and harsh chemicals which attack the unsaturated bonds in poly(acetylene) causing a concomittant deterioration of electrical properties.

DISCLOSURE OF THE INVENTION

This invention relates to new electrically conductive polymer blends and to methods for preparing such blends. These polymer blends are formed from a doped acetylene polymer intimately dispersed within a triblock thermoplastic elastomer. Triblock thermoplastic elastomers have an elastomeric central block, such as butadiene, and glassy outer blocks, such as styrene.

These electrically conductive blends have several advantages over blends of acetylene polymers previously proposed. For example, these blends offer a wide range of mechanical properties and electrical conductivity. Additionally, use of the triblock thermoplastic elastomers eliminates the necessity for post-curing processing, such as vulcanization, usually required with conventional elastomers.

Most importantly, these blends exhibit some of the physical properties of the elastomers at use temperatures and are processable as conventional thermoplastic materials, and yet these blends possess good electrical properties.

BRIEF DESCRIPTION OF THE FIGURE

The FIGURE is a plot of the stress-strain behavior of blends of poly(acetylene) and styrene-butadiene-styrene triblock co-polymer.

DETAILED DESCRIPTION OF THE INVENTION

Triblock co-polymers useful for this invention are formed from a center polymer block having elastomeric properties and outer polymer blocks having thermoplastic properties. Examples are styrene-isoprene-styrene; styrene-butadiene-styrene; and styrene-ethylene-butylene-styrene. Such triblock copolymers have the unique morphology of a glassy polystyrene domain in a rubbery diene matrix. They do not require conventional vulcanization or other post-processing or curing because the glassy polystyrene domain acts as physical crosslinks.

Poly(acetylene) can be introduced into the triblock co-polymer matrix by techniques based on those previously employed in forming blends of poly(acetylene) in these matrices. For instance, triblock co-polymer can be dissolved in a solvent containing a polymerization catalyst. The solvent can then be removed, such as with the aid of a vacuum, to form a film of the triblock co-polymer containing catalyst on the walls of a container. Acetylene gas can then be introduced into the container at temperatures sufficient for polymerization to occur within the triblock matrix.

Alternatively, acetylene gas can be bubbled through the solvent solution of triblock copolymer and films of the polyblend can subsequently be cast from the reaction mixture and dried in vacuum.

Suitable catalysts for acetylene polymerization include Shirakawa catalysts. A suitable Shirakawa catalyst can be formed by mixing 1.7 ml titanium tetrabutoxide Ti(OC$_4$H$_9$)$_4$, and 2.7 ml triethylaluminum Al(C$_2$H$_5$)$_3$, dissolved in 20 ml of toluene. Other suitable polymerization catalysts include a mixture of titanium tetra-iso-propoxide Ti(OC$_3$H$_7$)$_4$ and triethyl-aluminum in a similar solvent.

The temperature of polymerization is controlled so that acetylene diffuses into and polymerizes within the central elastomeric block of the triblock co-polymer, but does not significantly diffuse into and polymerize within the outer glassy blocks. This prevents degradation of the glassy polymer blocks which might otherwise occur. Generally, lower temperatures are employed than have been usual in the formation of previously described poly(acetylene) blends. As a general matter, temperatures from about −78° C. up to about room temperature can be employed to form suitable blends according to this invention. In one case, a temperature of 80° C. for a blend of poly(acetylene) in a styrene-butadiene-styrene triblock co-polymer was found to produce poly(acetylene) in the styrene which significantly degraded the mechanical properties of the blend.

Polymer blends are physical mixtures of two or more polymers. They are typically formed through processing steps into random or structured arrangements and include geometries that might be regarded as polymer-polymer composites. A much more detailed description of polymer blends is given in *Polymer Blends*, Ed. by D. R. Paul and S. Newman, Academic Press, N.J. (1978).

Doping is carried out to make the blends electrically conductive. For purposes of this invention, electrically conductive means a conductivity of at least about $10^{-6}$ohm$^{-1}$cm$^{-1}$.

Doping with electron donors or electron acceptors is performed according to art-recognized techniques. Examples of suitable dopants and methods for doping are described in detail in MacDiarmid, A. G. and Heeger, A. J., "Organic Metals and Semiconductors: The Chemistry of Polyacetylene, (CH)$_x$, and its Derivatives," *Synthetic Metals*, 1, (1979–80) 101–18, the teachings of which are hereby incorporated by reference.

Electrical conductivity of films prepared from blends of poly(acetylene) and a triblock copolymer can be enhanced by stretching the film. Stretching is believed to increase the crystallinity of the films.

Whereas poly(acetylene) is described above, and the experimental results also employ poly(acetylene), other polymers of acetylene could be employed with this invention. These include homopolymers of substituted acetylene, such as poly(methylacetylene) and poly(phenylacetylene). Additionally, co-polymers containing acetylene can also be employed in producing the electrically conducting polymer blends of this invention.

This invention will now be more specifically illustrated by the following examples.

EXAMPLE 1

Preparation of an Electrically-Conducting Blend of Poly(Acetylene) and Styrene-Isoprene-Styrene Triblock Co-Polymer Two grams of styrene-isoprene-styrene triblock copolymer (Kraton 1107, Shell Chemical Company) was dissolved in freshly distilled toluene in a three-necked flask under an argon atmosphere. Two ml of a Shirakawa catalyst, Ti(OC$_4$H$_9$)$_4$/Al(C$_2$H$_5$)$_3$ in toluene, was added to the flask by means of a syringe. All solvent was then slowly evaporated under vacuum by rotating the flask to insure that a uniform film of polymer formed on the wall of the flask. Acetylene gas was introduced into the flask at room temperature. Polymerization of acetylene was evident from the color change of the film from brown to black. The flask was filled with acetylene, closed and left overnight at room temperature. The reaction flask was then flushed with argon to remove monomer residue and the film was washed with freshly degased heptane at low temperature. The film was peeled from the sides of the flask, subsequently dried overnight under vacuum, and doped with iodine vapor overnight.

The film produced was flexible and metallic-looking. Infrared spectra were obtained using a Perkin-Elmer Model 299B spectrophotometer. The infrared spectrum of the blend indicated that the material contained both triblock co-polymer and poly(acetylene) moieties. Poly(acetylene) was present in the predominantly trans-configuration as evidenced by a characteristic infrared absorption band at 1015 cm$^{-1}$.

X-ray diffraction patterns were recorded on a Phillips Vertical Diffractometer with a solid state scintillation detector. X-ray data clearly indicated that poly(acetylene) moeities in the blend retained high crystallinity by showig a sharp peak at $2\theta \sim 23$ to $25°$ in the x-ray diffraction patterns.

The detailed morphology of the blend was investigated by electron microscopy employing the Phillips EM 400 T instrument. The results indicated that poly(acetylene) was incorporated into the rubbery matrix rather than the glassy polystyrene domain. The electrical conductivity of the film was measured using standard four point probe techniques. It was 60 $ohm^{-1}cm^{-1}$.

EXAMPLE 2

Preparation of Blends of Polyacetylene and Styrene-Budadiene-Styrene and Polyacetylene and Styrene-Ethylene-Butylene Styrene The procedures of Example 1 were employed except that styrene-butadiene-styrene (Kraton 1101) and styrene-ethylene-butylene-styrene (Kraton 4609) were substituted for the styrene-isoprene-styrene triblock co-polymer. The results were similar.

EXAMPLE 3

Preparation of Blends OF Polyacetylene and Triblock Co-Polymers by an Alternative Procedure In an alternative procedure, polymerization of acetylene in triblock co-polymers was carried out by bubbling acetylene gas into the toluene solution of the triblock co-polymers. A gel form of the polyacetylene/triblock co-polymer blend was produced. After evaporating toluene under vacuum, the gel was pressed and dried under vacuum. Highly elastic films resulted which were subsequently doped with either iodine or $FeCl_3$ in nitromethane. These films were also flexible and metallic in nature and their conductivities were found to be essentially the same as those found with film prepared by the method of Example 1.

EXAMPLE 4

Elongation of the Blend

Elongation upon doping of blends of poly(acetylene) and styrene-butadiene-styrene prepared according to the procedure of Example 1 was studied. Each sample, after exposure to iodine vapor for a predetermined time, was stretched to the breaking point with a Minarik Testing machine and then measured.

| Time Doped (minutes) | Conductivities ($ohm^{-1} cm^{-1}$) | Elongation (%) | % $I_2$ Uptake |
|---|---|---|---|
| 0 | — | 1127 | — |
| 15 | 0.95 | 335 | 14.8 |
| 30 | 0.54 | 314 | 15 |
| 60 | 2.49 | 300 | 24.3 |
| 120 | 2.35 | 255 | 29.3 |
| 180 | 3.00 | 167 | 29.5 |

It can be seen that the undoped blend was found to be extremely elastic and could be stretched up to 1100 percent of its original length. Upon doping with iodine, the elongation was considerably reduced. This corroborates the electron microscopy results indicating that poly(acetylene) moeities preferentially incorporate into the rubbery region of the triblock polymer.

EXAMPLE 5

Effects on Stress-Strain Curve or Increasing Poly(acetylene) Contact

Stress-strain curves were obtained for blends of poly(acetylene) and styrene-butadiene-styrene triblock copolymer prepared according to the procedure of Example 1. The data were derived from ASTMD-638 standard test. The results are shown in the Figure wherein it can be seen that blends containing 4 percent polyacetylene behave almost like the pure triblock co-polymer. As more poly(acetylene) is incorporated into the blends, the properties of the material become more thermoplastic in nature.

Industrial Applicability

The invention described herein relates to electrically conductive poly(acetylene) blends. Such conductive polymer blends are useful in forming microwave absorbers, electromagnetic shields, lightweight batteries, flexible strain gauges, chemical sensors and switches.

Equivalents

Those skilled in the art will recognize or be able to acertain, using no more than routine experimentation, many equivalents to the specific embodiments of the invention described herein. As an example, α-methyl styrene could be substituted for styrene in the triblock co-polymers described. Such equivalents are intended to be encompassed by the following claims.

We claim:

1. A polymer blend comprising a triblock thermoplastic elastomer having an elastomeric central block and glassy outer blocks with a conjugated acetylene polymer dispersed within the central block of said triblock thermoplastic elastomer, said conjugated acetylene polymer being present in a sufficient amount and doped with an electron doner or an electron acceptor to a sufficient level to provide said polymer blend with an electrical conductivity of at least about $10^{-6} ohm^{-1} cm^{-1}$.

2. A polymer blend of claim 1 wherein said glassy outer blocks are styrene.

3. A polymer blend of claim 2 wherein said elastomeric central block is butadiene.

4. A polymer blend of claim 2 wherein said elastomeric central block is isoprene.

5. A polymer blend of claim 2 wherein said elastomeric central block is ethylene-butylene.

6. A polymer blend of claim 1, 2, 3, 4 or 5 wherein said acetylene polymer is poly(acetylene).

* * * * *